UNITED STATES PATENT OFFICE.

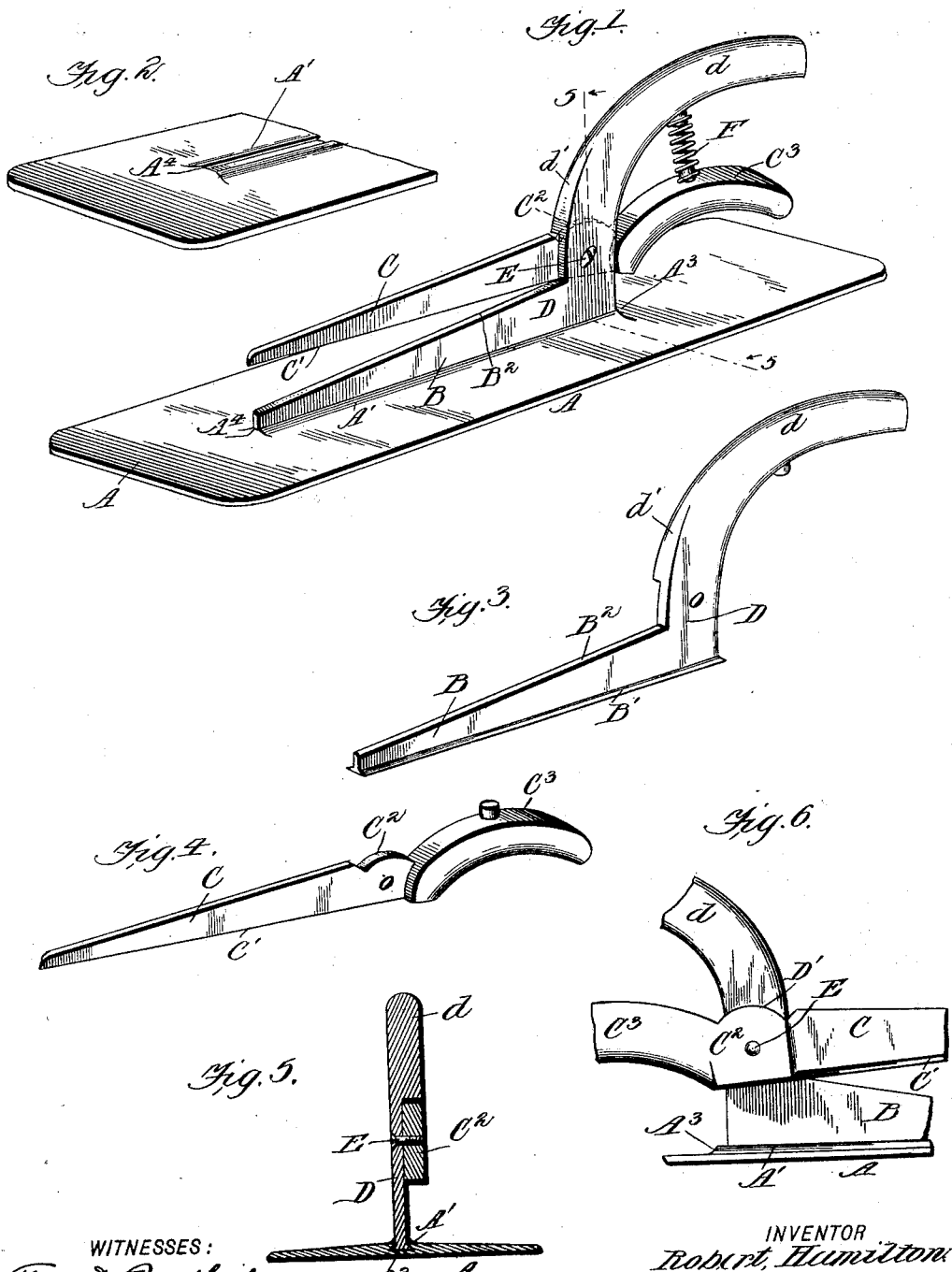

ROBERT HAMILTON, OF COMMERCE, TEXAS.

SHEARS.

SPECIFICATION forming part of Letters Patent No. 703,253, dated June 24, 1902.

Application filed September 26, 1901. Serial No. 76,655. (No model.)

*To all whom it may concern:*

Be it known that I, ROBERT HAMILTON, a citizen of the United States, and a resident of Commerce, in the county of Hunt and State of Texas, have made certain new and useful Improvements in Shears, of which the following is a specification.

My invention is an improvement in shears, and particularly in shears designed for cutting heavy material, such as ducking, sailors' canvas, oil-cloth, tin, leather, and other heavy cloths and material; and the invention consists in certain novel constructions and combinations of parts, as will be hereinafter described and claimed.

In the drawings, Figure 1 is a perspective view of my shears ready for use. Fig. 2 is a detail perspective view of a portion of the base-plate. Fig. 3 is a detail perspective view of the base-blade and its handle. Fig. 4 is a detail perspective view of the upper blade and its handle. Fig. 5 is a cross-sectional view on about line 5 5 of Fig. 1; and Fig. 6 is a detail side view, partly broken away, of the shears from the opposite side from that shown in Fig. 1.

By my invention I seek to provide a novel construction of shears for use in cutting heavy material, in which the shears can be readily operated in connection with a base-plate to slide beneath the material being cut and can be detached from said base-plate in order to permit the operation of the shears without the said base-plate, as may be desired. In Fig. 1 I show the device complete ready for use, with the base-plate extending beneath the material to be cut. As shown in Fig. 1, the shears include the base-plate A, the base-blade B, and the upper blade C. The base A and blade B are preferably detachably connected, so the blade B can be applied to the plate A, as shown in Fig. 1, or can be separated therefrom, as shown in Fig. 3. This is preferably effected by forming the plate A at its middle portion with a slight rise at A' and producing therein an undercut groove $A^2$, which opens to the rear at $A^3$ and is closed at its front end at $A^4$, so the blade B may have its longitudinal base-rib B' slipped into and out of the groove $A^2$ from the rear end of said groove. It will be noticed that the base edge of the blade B is formed on a straight line, and the rib B' forms a flat runner, upon which the blade may be caused to slide over any supporting-surface when the shears are used without the base-plate A, while at the same time said rib B' forms a convenient means to aid in detachably connecting the base-blade with the plate A.

As will be understood from the foregoing description, the blade B may be conveniently applied to the base-plate A, as shown in Fig. 1, and used in connection therewith or can be removed from the base-plate, as shown at Fig. 3. At its rear end the base-blade B is provided with an upwardly-projecting arm D, which is curved rearwardly at its upper end at $d$ to form the handhold, which can be grasped by the operator in using the shears. The blade B is beveled on one side at $B^2$, and the arm D is projected on its side opposite the bevel $B^2$, beyond the plane of the body of the blade B, forming at $d'$ a lateral projection, whose lower wall at D' faces downwardly and is curved concentrically with the pivot E between the blades in such manner as to form a bearing for the rounded knuckle on the upper blade C, as presently described.

The blade C has its edge C' formed to coöperate with the edge $B^2$ of the blade B and is provided at $C^2$ with a rounded knuckle which fits and operates beneath the rounded shoulder D' of the handle D when the blade C is pivoted at E by the pivoting-screw to the handle D, as shown in Figs. 1, 5, and 6.

The blade C is provided in rear of its knuckle $C^2$ with a handle $C^3$, which is arranged below the handle $d$, so it can be operated in connection with said handle to produce the shearing action desired. A spring F operates between the two handles and serves to open the blades of the shears, as will be understood from Fig. 1.

It will be noticed that my shears involve no complications and include a construction in which the handle of the fixed blade may be grasped by the thumb and forefinger of the hand in such manner as to hold the shears steadily in operating and guiding the same, while the handle of the upper blade may be operated by the other fingers of the hand, rendering the operation certain and easy. It will also be understood that the pivotal connection of the upper and base blade is such as to relieve the pivotal screw of much of the strain in the operation of cutting; also, that the base-blade may be readily connected with or detached from the base-plate.

Having thus described my invention, what I claim, and desire to secure by Letters Patent, is—

1. The improvement in shears herein described consisting of the base-plate provided in its upper face with a longitudinal undercut groove open at one end, the base-blade provided at its lower edge with a rib fitted to the undercut groove of the base-plate and provided at the rear end of said blade with an upwardly-projecting arm curved rearwardly to form a handle and having said arm provided with a downwardly-facing curved shoulder, the upper blade having a knuckle operating beneath said shoulder and pivoted to the base-blade and provided with a handle extending beneath that of the base-blade and a spring operating between said handles.

2. The shears herein described comprising the base-plate the base-blade secured thereto and provided with the upwardly-projecting arm extending rearwardly to form a handle and having said arm provided with a lateral downwardly-facing shoulder, and the upper blade having a knuckle fitting and operating below said shoulder and pivoted to the base-blade and provided with a handle extending beneath the handle of the base-blade substantially as set forth.

3. The combination of the base-plate, the base-blade thereon and provided at its rear end with an upwardly-projecting arm having a rearwardly-extending handle portion overlying the base-plate in rear of the base-blade, and the upper blade provided at its rear end with a handle portion underlying the handle of the base-blade and operating between the same and the rear portion of the base-plate substantially as set forth.

ROBERT HAMILTON.

Witnesses:
N. C. McMILLAN,
J. M. GOLSON.